[84.]

WILLIAM C. BIBB.
Steam Wagon and Plows.

No. 119,216.  Patented Sep. 26, 1871.

Witnesses.  Inventor.

[84.]

WILLIAM C. BIBB.
Steam Wagon and Plows.

No. 119,216.　　　　　　　　　Patented Sep. 26, 1871.

Witnesses.　　　　　　　　　Inventor.
Peter P. Pitchlynn　　　　　　William C. Bibb
Wm. Howard

119,216

UNITED STATES PATENT OFFICE.

WILLIAM C. BIBB, OF MADISON, GEORGIA.

IMPROVEMENT IN STEAM-WAGONS AND PLOWS.

Specification forming part of Letters Patent No. 119,216, dated September 26, 1871.

*To all whom it may concern:*

Be it known that I, WILLIAM C. BIBB, of the town of Madison, in the county of Morgan and State of Georgia, have invented certain Improvements in Steam-Wagon and Plows, of which the following is a specification:

The first part of my invention relates to a method of running and steering a steam-wagon. The second part relates to a method of giving greater frictional contact with the ground to the carrying-wheels, and the third part relates to an improved sowing and harrowing device.

Figure 1:
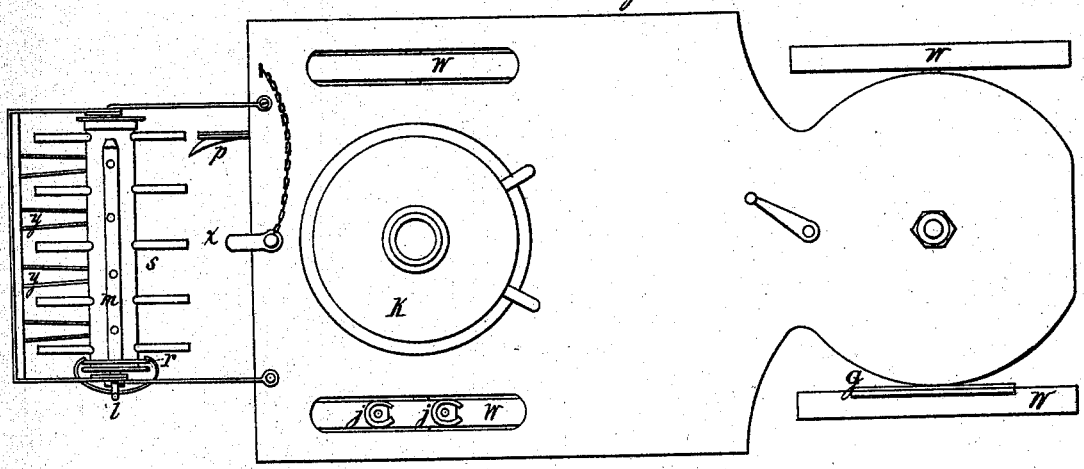
Figure 2:
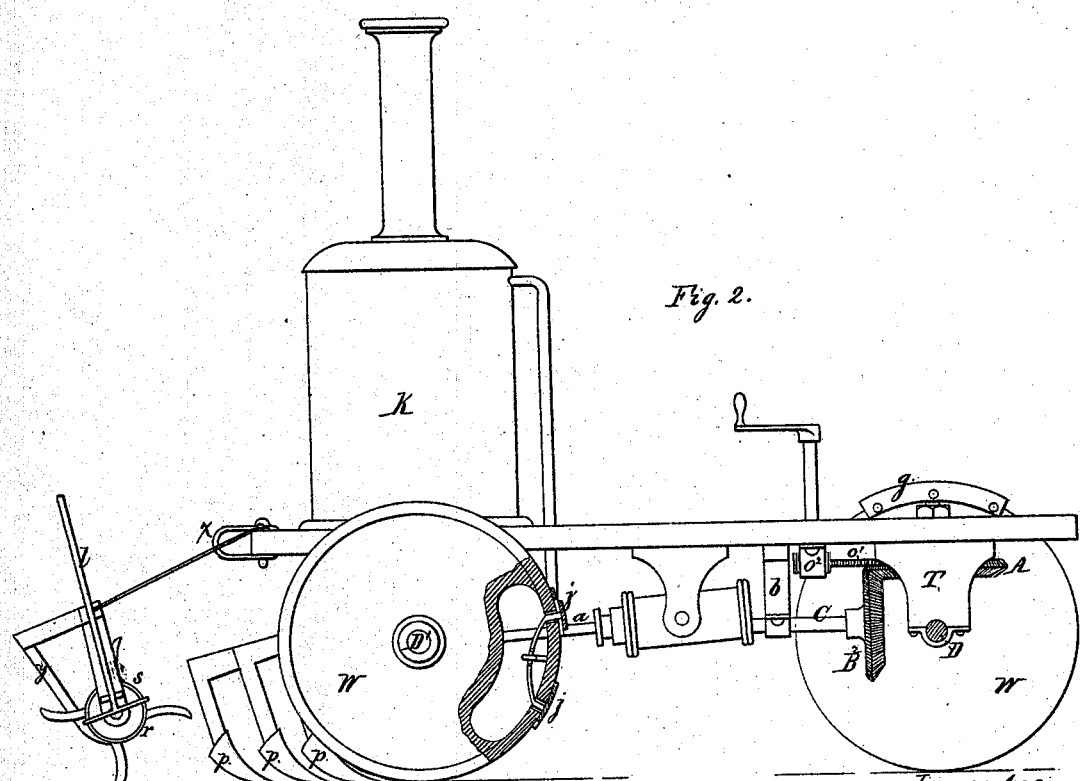
Figure 3:
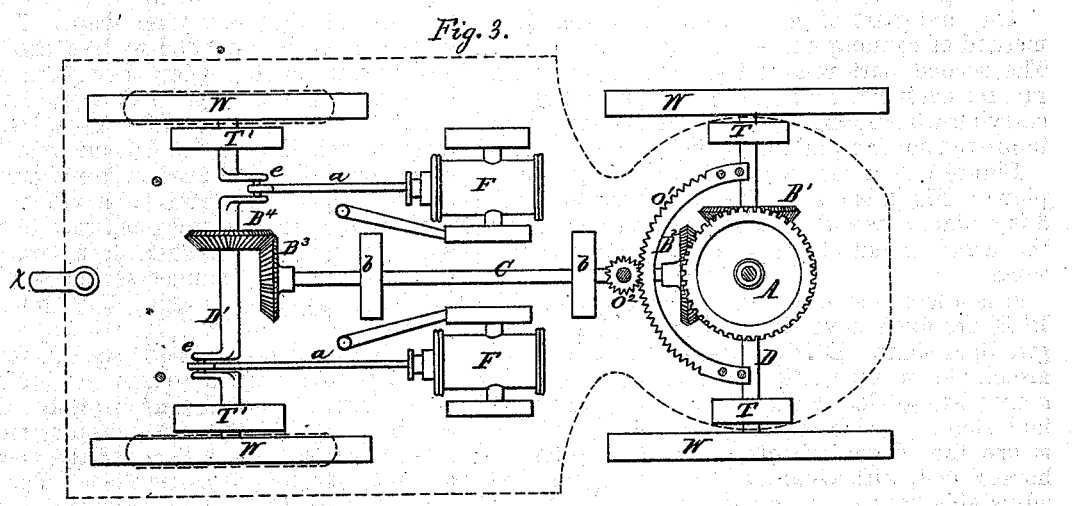

Figure 1 is a plan view of steam-wagon and plows. Fig. 2 is a side view of the same. Fig. 3 is a plan view with platform removed, showing the arrangement of the machinery for working same.

A is a loose beveled wheel with cogs. $B^3$ $B^4$ $B^1$ $B^2$ are fixed beveled cog-wheels. C is a longitudinal shaft. D D' are the wagon-axles. $e$ $e$ are cranks on rear axle. F F are cylinders. $a$ $a$ are piston-rods. $b$ $b$ are hangers for longitudinal shaft. $o^1$ $o^2$ is steering apparatus. $w$ $w$ $w$ $w$ are the wagon-wheels. J J are forms of horses' feet, with cleaners. $g$ is a segment of adjustable flange. $p$ $p$ $p$ are plows. $s$ is a combined seeder and harrow. $y$ is an apron for same. $l$ is a lever on seeder. $m$ is a slide for opening and closing seed-holes. $r$ is a ring on end of seeder. T T' are supports for body of wagon. $x$ is a coupling on rear of wagon. $k$ is a furnace and boiler.

When it is desired to move the wagon the power is applied to the cranks $e$ $e$ by means of rods $a$ $a$ connected with the same and working in the cylinders F F. That power may be steam, gas, or any other of sufficient force so that the rear wheels attached to axle are caused to revolve. This motion is at the same time transmitted, by the action of the beveled spur-wheel $B^4$ engaging the beveled spur-wheel $B^3$ on end of longitudinal shaft C, and causing it to revolve with the beveled spur-wheel $B^2$ affixed to its front end, and this in turn engages with the loose spur-wheel A, causing that to revolve, and it in turn engages the beveled spur-wheel $B^1$ on front axle, by which the front axle and wheels of wagon are rotated, and by the combined action the wagon is forced forward or backward at pleasure, while its course may be directed by the steering apparatus $o^1$ $o^2$. The forms of feet J J are intended to be placed around the periphery of each wheel, to give frictional resistance. The forward pressure of the frog and lateral pressure of the sides of the foot resist the backward pressure of the toe, and thus afford more friction than any other shape. The cleaners attached are intended to free the forms of mud or dirt, so that when they press upon the earth the full grasp upon the same may be obtained. $g$ is the segment of an adjustable flange, which in practice will encircle the four wheels when it is intended to use the wagon on a railway, when the front axle will be fixed so as to prevent its turning backward or forward, as on common roads, when necessary to direct its course. $s$ is a combined seeder and harrow, having an apron, $y$, a lever, $l$, a slide, $m$, and ring $r$.

All that is necessary to operate this seeder and harrow is to move the wagon to which it is attached forward, and the harrow-teeth will engage with the ground and cause a rotary movement of seeder, causing it to scatter the seed, while the harrow-teeth will cover them. The apron $y$ bears forward under the harrow any seed escaping from seeder in the rear. The slides, as $m$, are intended to be placed between each row of harrow-teeth lengthwise, as shown, and operated by the action of the lever $l$ and ring $r$ which encircles the slides, so that they may be moved so as to open or close the holes through which the seed is intended to be discharged. There is another ring on the opposite end of seeder, with larger opening, and is intended for loading the seeder with grain. The outer holes in the slides $m$ are elongated, so the other openings in seeder may be closed and yet leave these end holes open for planting corn in drills. In front of seeder, and underneath the wagon, plows $p$ $p$ $p$ may be attached when it is desired to turn over the land before seeding and harrowing, and the whole can be performed at one operation. T T are supports for the body of wagon, and bear upon the axles near the wheels, both before and behind, at their points of greatest practicable strength. The front support also serves for the attachment of a portion of the steering apparatus, by which the axle is left to rotate more freely.

I am aware that rotary seeders have been used but I only intend to claim their use in connection with steam or other power wagons other than horses.

I claim as my invention, in connection with power wagons with steam or other power on board, and ask Letters Patent for—

1. In a steam-wagon for plowing and other purposes, the combination of cylinders F, piston-rods $a$, axle-trees D' D, pinions $B^4$ and $B^3$, shaft C, pinions $B^2$ and $B^1$, loose wheel A, pinion $o^2$, curved rack $o^1$, and carrying-wheels $w$, for the purposes set forth.

2. The horse-feet devices J J, in combination with the carrying-wheels $w$, for the purpose described.

3. The seeding and harrowing devices consisting of cylinder $s$, apron $y$, lever $l$, slide $m$, ring $r$, and harrow-teeth, for the purpose described.

WILLIAM C. BIBB.

Witnesses:
WM. HOWARD,
A. MOORE. (84)